US008682559B2

(12) United States Patent
Kolbe et al.

(10) Patent No.: US 8,682,559 B2
(45) Date of Patent: Mar. 25, 2014

(54) DISTRIBUTED ELECTRICAL BRAKE CIRCUIT AND SYSTEM

(75) Inventors: Nils Kolbe, Winsen (DE); Marcus Prochaska, Pattensen (DE)

(73) Assignee: NXP B.V., Eindhoven (NL)

( * ) Notice: Subject to any disclaimer, the term of this patent is extended or adjusted under 35 U.S.C. 154(b) by 451 days.

(21) Appl. No.: 12/967,943

(22) Filed: Dec. 14, 2010

(65) Prior Publication Data

US 2012/0150362 A1 Jun. 14, 2012

(51) Int. Cl.
*B60T 7/12* (2006.01)
*G05D 1/00* (2006.01)
*G06F 7/00* (2006.01)
*G06F 17/00* (2006.01)

(52) U.S. Cl.
USPC ........ 701/78; 701/1; 701/70; 701/71; 701/83; 701/81

(58) Field of Classification Search
USPC .......................................................... 701/70
See application file for complete search history.

(56) References Cited

U.S. PATENT DOCUMENTS

| | | | |
|---|---|---|---|
| 5,549,364 A * | 8/1996 | Mayr-Frohlich et al. | 303/9.69 |
| 5,980,000 A * | 11/1999 | Kolbe et al. | 303/139 |
| 6,122,588 A * | 9/2000 | Shehan et al. | 701/93 |
| 6,256,570 B1 * | 7/2001 | Weiberle et al. | 701/70 |
| 6,317,675 B1 * | 11/2001 | Stolzl et al. | 701/76 |
| 6,446,024 B1 * | 9/2002 | Leimbach et al. | 702/141 |
| 6,810,316 B2 * | 10/2004 | Yokoyama et al. | 701/70 |
| 7,289,897 B2 * | 10/2007 | Yokoyama et al. | 701/70 |
| 7,413,265 B2 * | 8/2008 | Tione | 303/122.04 |
| 7,516,823 B2 * | 4/2009 | Kikuchi et al. | 188/158 |
| 8,175,784 B2 * | 5/2012 | Semsey | 701/70 |
| 2003/0083797 A1 * | 5/2003 | Yokoyama et al. | 701/70 |
| 2003/0167108 A1 * | 9/2003 | Albrichsfeld et al. | 701/1 |
| 2003/0205438 A1 * | 11/2003 | Hartsock | 188/342 |
| 2005/0065696 A1 * | 3/2005 | Yokoyama et al. | 701/70 |
| 2005/0127749 A1 | 6/2005 | Hartmann et al. | |
| 2005/0212354 A1 * | 9/2005 | Tione | 303/20 |
| 2005/0246086 A1 * | 11/2005 | Motosugi et al. | 701/78 |
| 2006/0119174 A1 * | 6/2006 | Frashure | 303/127 |

FOREIGN PATENT DOCUMENTS

| | | |
|---|---|---|
| EP | 1584532 A1 | 10/2005 |
| GB | 2313746 A | 12/1997 |
| WO | 2006100539 A1 | 9/2006 |

OTHER PUBLICATIONS

FlexRay Consortium, "Requirements Specification", V2.1.
FlexRay Consortium, "Protocol Specification", V2.1, (Rev. A).
FlexRay Consortium, "Electrical Physical Layer Specification" V2.1, (Rev B).
FlexRay Product Data Sheet, "Node Transceiver TJA1082", Rev. 02, NXP Semiconductors of Eindhoven, The Neterlands), (Aug. 2009).

* cited by examiner

*Primary Examiner* — Bhavesh V Amin

(57) ABSTRACT

The application of braking force to drive components that move a vehicle is controlled. As consistent with one or more example embodiments, an integrated circuit chip is located at each of two or more drive components (e.g., wheels) of a vehicle for controlling the application of a braking force to the drive component independently of the application of braking force to other drive components. Each of the integrated circuit chips communicate with one another over a vehicle network, with brake control (e.g., using an algorithm to limit wheel slip) being carried out separately at each drive component.

23 Claims, 2 Drawing Sheets

DISTRIBUTED ELECTRICAL BRAKE CIRCUIT AND SYSTEM

Figure 1:
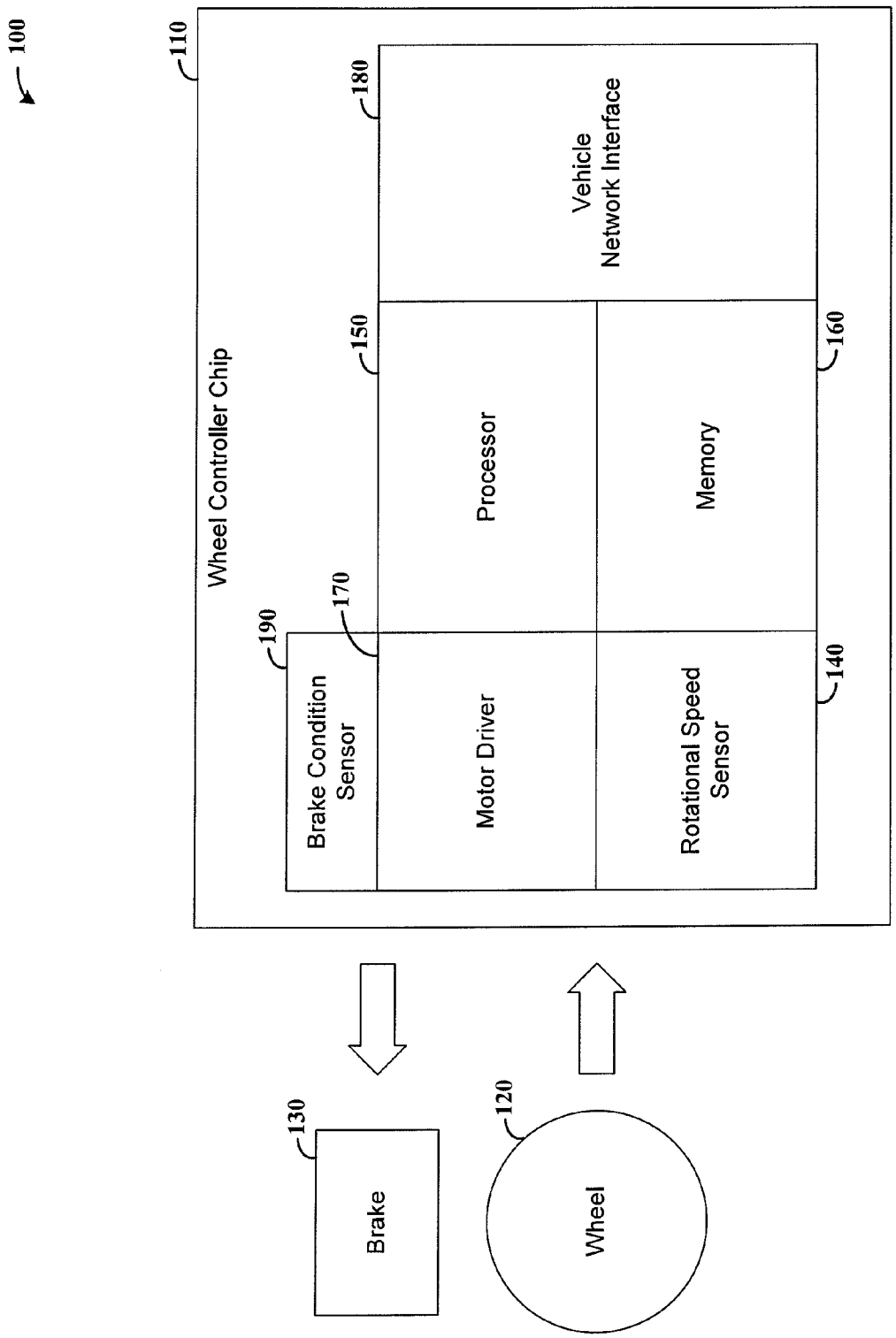

Various aspects of the present invention are directed to control circuits and systems, and more particularly to control circuits for decentralized electrical brake systems.

A variety of braking systems and components are used in automotive applications, which have included cable-actuated brakes, drum brakes, hydraulic brakes and electric brakes. Many brake systems are often controlled using systems for preventing undesirable locking conditions, often referred to as an anti-lock braking system (ABS) or electronic stability program (ESP).

As the demand for complex functionality in automotive applications increases, the complexity of automotive systems such as ABS braking systems increases as well. At times, this complexity can be burdensome as relative to a variety of manufacturing approaches. Moreover, the requirements for achieving such complexity in certain systems can stand in contrast with other goals or aims, such as those relating to cost, quality, reliability and efficiency.

Accordingly, the implementation of a variety of automotive control systems, such as brake systems, continues to be challenging.

Various example embodiments are directed to electronic brake control circuits and systems for a variety of applications, including those discussed above.

Various embodiments are directed to devices, methods and systems for controlling the application of braking force to drive components, such as wheels, that move a vehicle. As consistent with one or more example embodiments, an integrated circuit chip is located at each of two or more wheels of a vehicle for controlling the application of a braking force to the wheel, with brake-control processing functions carried out independently at each wheel. Each of the integrated circuit chips communicate with one another over a vehicle network, such that the independent control (e.g., using an algorithm to limit wheel slip) at each wheel can use characteristics of the other wheels as inputs.

Another example embodiment is directed to a remote braking mechanism control unit for use in a vehicle having at least two vehicle drive components (e.g., wheels) and a remote braking mechanism for each of the drive components. The remote braking mechanism control unit includes a rotational speed sensor, a network interface circuit and a logic circuit. The rotational speed sensor senses the rotational speed of one of the drive components and outputs rotational speed data for another one of the drive components. The network interface circuit communicates over a vehicle communications network to receive rotational speed data for the other one of the drive components, and provides the sensed rotational speed data to a remote braking mechanism control unit for the other one of the drive components. The logic circuit is responsive to receiving a braking input signal by generating an output to control the control unit's remote braking mechanism to apply braking force to the drive component independently from the control unit for the other drive component, based upon the sensed rotational speed, the received rotational speed data for the other drive component, and a braking input signal received from a user interface braking device.

In accordance with another example embodiment, an integrated wheel control circuit controls the application of braking force to a vehicle drive component that moves a vehicle. The integrated circuit includes a memory circuit, a rotational speed sensor, a network interface circuit, a brake driver circuit and a logic circuit. The memory circuit stores executable data for controlling the application of braking force to the drive component. The rotational speed sensor senses the rotational speed of the drive component. The network interface circuit receives rotational speed data from at least one other drive component of the vehicle over a vehicle network, as well as a braking input signal. The network interface circuit also sends data indicative of the sensed rotational speed over the network for use in controlling other vehicle drive components. The brake driver circuit generates a drive signal for driving a brake to apply braking force to the drive component. The logic circuit accesses and uses the executable data in the memory circuit to control the brake driver circuit for applying the braking force, based on the rotational speed sensed by the rotational speed sensor and both the braking input signal and rotational speed data received via the network interface circuit.

Another example embodiment is directed to a distributed vehicle braking system having a user interface device that receives a braking input from a user for slowing the vehicle, as well as a brake and wheel control circuit for each of at least two wheels that drive the vehicle along a surface. The brake applies a braking force to slow the wheel, and the wheel control circuit includes an integrated circuit chip that senses wheel speed and also controls the application of the braking force. The integrated circuit chip may, for example, be implemented using an integrated circuit as discussed above, with memory, a rotational speed sensor, a network interface circuit, a brake driver and a processor (logic circuit). The processor controls the brake driver circuit to generate a drive signal to control the brake, based on rotational wheel speed detected by the rotational speed sensor as well as the braking input and wheel speed data for other wheels of the vehicle. The respective processor circuits at each wheel independently control the brake driver circuit for the wheel, relative to the processor circuit of another of the at least two wheels.

Another example embodiment is directed to a method for controlling the application of braking force to drive components that move a vehicle, with each drive component having a control unit that independently controls the application of braking force to the drive component, relative to other drive components in the vehicle. The following steps are carried out in a processor circuit at each drive component having a brake. Executable data is stored for controlling the application of braking force to the drive component. The rotational speed of the drive component is sensed, and rotational speed data for other drive components of the vehicle is received from a corresponding processor circuit at each drive component, over a vehicle network. Data indicative of the sensed rotational speed of the drive component is sent to the other processor circuits at the other drive components over the network as well. A braking input signal is also received, over the network or otherwise at the processor circuit. A logic circuit accesses and uses the stored executable data, together with the rotational speed sensed by the rotational speed sensor and both the braking input signal and rotational speed data received via the network, to control the generation of a drive signal, for driving the brake to apply braking force to the drive component.

The above discussion is not intended to describe each embodiment or every implementation of the present disclosure. The figures and following description also exemplify various embodiments.

Figure 2:
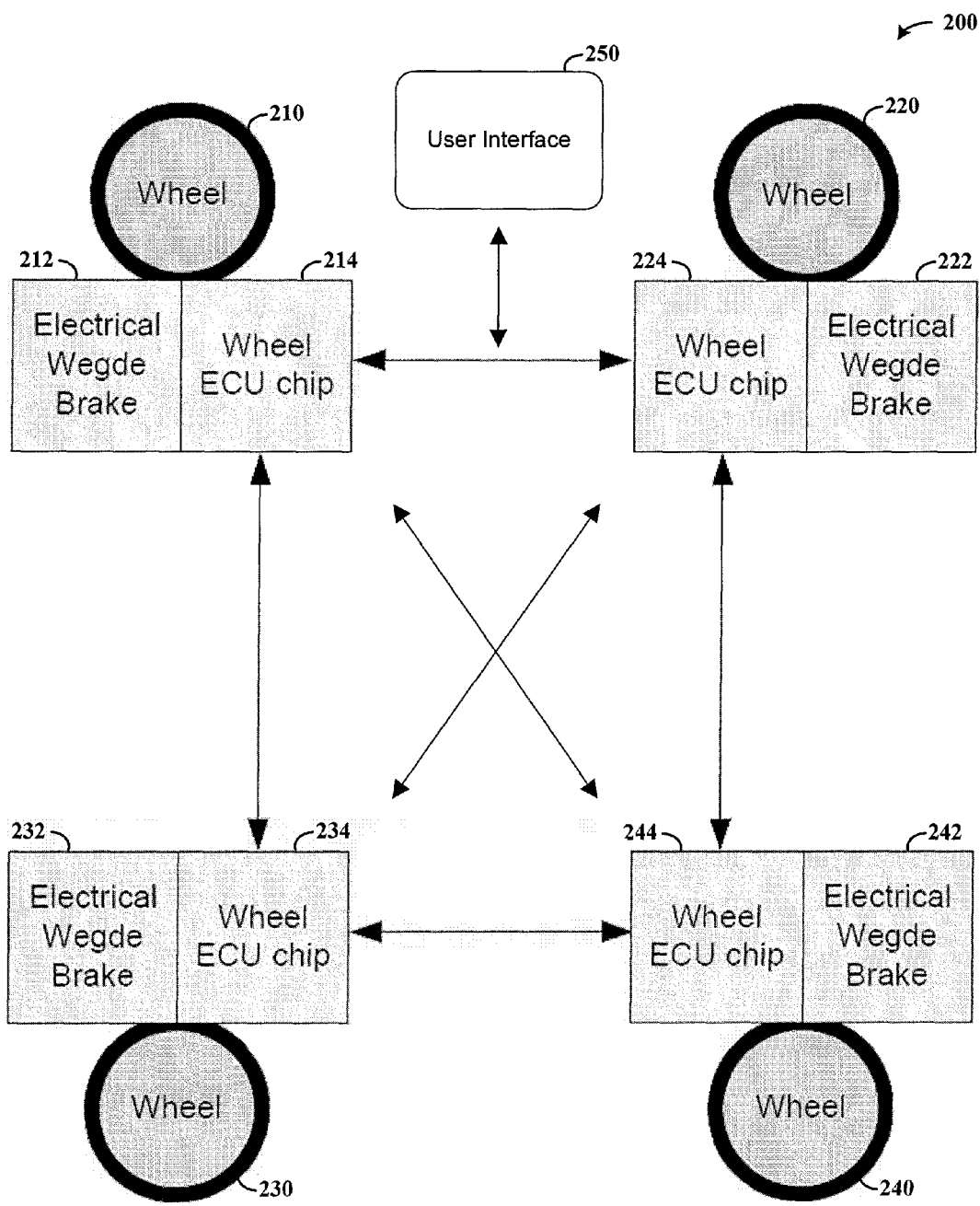

Various example embodiments may be more completely understood in consideration of the following detailed description in connection with the accompanying drawings, in which:

FIG. 1 shows a remote brake controller for a distributed braking system, according to an example embodiment of the present invention; and FIG. 2 shows a distributed braking system, according to another example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims. Furthermore, the term "example" as used throughout this document is by way of illustration, and not limitation.

The present invention is believed to be applicable to a variety of different types of processes, devices and arrangements for use with brake applications, including electronic brakes and related systems for automotive applications. While the present invention is not necessarily limited in this context, various aspects of the invention may be appreciated through a discussion of various related examples.

According to an example embodiment, a decentralized brake system includes remote (decentralized) brake control circuits that receive and process an electrical braking signal input to apply braking force to slow a vehicle such as an automobile. The electrical braking signal input is received over a vehicular communications network from a user interface type of brake unit that communicates to each brake control circuit. Each brake control unit independently controls the application of braking force to a wheel (or other vehicle drive components such as a track), relative to the other brake control unit. Several such units are readily implemented to control the application of braking force to all wheels in a vehicle (e.g., one unit can be used for each wheel). Accordingly, the application of a braking control algorithm for an antilock braking system (ABS) or electronic stability program (ESP) can be carried out independently at each wheel.

In some implementations, the user interface type of brake unit receives a braking input from a user interface device such as a foot-actuated or hand-actuated braking pedal or lever, or is part of such a user interface device. In some implementations, this system is used to reduce the weight of the vehicle as may be relevant, for example to hydraulic systems involving a central reservoir and hydraulic components that distribute hydraulic fluid to brakes at each wheel. This reduced weight can be used, for example, to facilitate a reduction in emissions (e.g., CO2 emissions) in requiring less effort to move the vehicle.

A variety of different types of braking systems are used in accordance with various embodiments. In some embodiments, each remote brake control circuit controls one or more electrical wedge brakes (EWB). Other embodiments are directed to controlling other types of brakes, such as another electrical brake type, a hydraulic brake (e.g., using a fluid cylinder in close proximity to the applicable wheel), or an air brake. In some contexts, one or more of these embodiments involves eliminating one or more components, such as hydraulic tubes, brake chambers, brake boosters and related controllers, to reduce the weight of a vehicle.

In some embodiments, an electrical brake system employs sensors such as Anisotropic magnetoresistive (AMR), Giant magnetoresisitve (GMR), or Hall sensors for contactless rotational speed sensing of a wheel or other component to which braking is to be applied, with the following reference made to a wheel application by way of example. An output of the sensors is used to provide an indication of the speed of the wheel and apply braking accordingly. In some implementations, the wheel speed output is provided directly to a remote brake control circuit, which uses the speed indication in applying braking force. In other implementations, the wheel speed output is provided (e.g., via a remote brake control circuit) to other remote brake control circuits that use information about the wheel speed to control the application of braking force.

In some embodiments, a wheel control unit (e.g., remote brake control circuit as discussed herein) includes an integrated circuit chip having a rotational speed sensor, a driver unit, a processor and a network interface, which may be implemented as discreet components. The rotational speed sensor measures wheel speed, such as by sensing magnetic aspects of a reference component that is part of or coupled to the wheel, and that rotates with the wheel. Such a reference component may include, for example, an active or passive encoder wheel with magnetic characteristics. The driver unit controls the application of a brake, such as an electrical brake. The processor can be implemented using a variety of logic circuits such as a central processing unit (CPU), and processes brake algorithms for operating the driver unit. Such algorithms may, for example, include algorithms for applying braking to multiple wheels in accordance with an ABS or ESP braking application. The network interface facilitates the communication of data with other wheel control units and, where appropriate, a brake input or controller coupled to a user input device such as a brake pedal or a brake lever.

In various embodiments, a decentralized braking control approach involves the use of multiple wheel control units as discussed above, each implementing aspects of a braking control algorithm using local information regarding a wheel to which braking is applied, together with remote information from other wheel control units regarding wheel speed and/or other characteristics of the other wheels, such as braking force applied to the other wheels, or detected slip as may occur in wet or icy conditions. The wheel control units are also responsive to a user interface input for the application of braking force to each respective wheel. In this context, the wheel control units can operate in an autonomous nature for certain aspects, such as ABS, ESP and traction control, while also operating in a cooperative nature relative to the other wheel control units.

A variety of different types of communications networks can be used in connection with the example embodiments as discussed herein. For example, many embodiments are directed to devices, systems and methods involving a communications network and transmitters, receivers and/or transceivers that operate in accordance with protocols, requirements and other conditions as specified by the FlexRay Consortium. Such operation may, for example, involve aspects that correspond to the information presented in documents published by FlexRay including: Requirements Specification V2.1, Protocol Specification V2.1 (Rev. A), all FlexRay Electrical Physical Layer Specifications including Specifications V2.1 (Rev. B) and V3.0, Preliminary Node-Local Bus Guardian Specification V2.0.9, and Preliminary Central Bus Guardian Specification V2.0.9, all of which are fully incorporated herein by reference. Various embodiments may also be implemented with networks and circuits as described in the FlexRay node transceiver TJA1082 Product data sheet, Rev. 02, 10 Aug. 2009 (published by NXP Semiconductors of Eindhoven, The Netherlands), which is fully incorporated herein by reference. Other embodiments are directed to communications circuits operated in accordance with the vehicle Controller Area Network (CAN or CAN-bus) such as specified in the International Organization for Standardization standard ISO11898, all aspects of which are also incorporated herein by reference. Still other embodiments are directed to a transmitter or other communications circuit configured to operate in accordance with the IVN3 Intelligent Vehicle Network system available from Clever Devices of Plainview, N.Y.

While described herein in connection with specific braking applications, one or more of the various embodiments can be implemented in connection with other types of braking applications, as well as other vehicle control applications. For instance, while various discussion herein refers to braking applied to wheels, a similar approach can be used to apply braking force to other vehicle movement components such as tracks and propellers.

In addition, various embodiments or aspects thereof may be implemented in connection with other systems, such as traction control systems. For instance, wheel speed sensing aspects of a wheel control unit as discussed above may be implemented in connection with traction control systems for driving wheels or other components of a vehicle. Such applications may involve, for example, the selective application of braking as may be integrated with the application of rotational drive to certain wheels. These and other applications can be used to assist in controlling a vehicle for a variety of applications, including normal driving applications, slow or high speed applications, parking, maneuvering and others.

Turning now to the figures, FIG. 1 shows a remote brake controller circuit 100 for a distributed braking system, according to another example embodiment of the present invention. The system 100 includes a single-chip wheel electronic control unit (ECU) 110 that controls the speed of a wheel 120 using a brake 130. The single-chip wheel ECU 110 includes a rotational speed sensor 140, such as an AMR rotational speed sensor, giant magnetoresistance (GMR) sensor, or a Hall sensor, that measures the speed of the wheel 120 which is used to control the application of the brake 130. In these contexts and as consistent with the above, the brake 130 may include, for example, a disc brake, electric wedge brake, hydraulic brake, air brake or an engine-related brake-type system that generates electricity, such as for hybrid electric/fuel vehicles.

The ECU 110 also includes a processor 150 that uses information including wheel speed data obtained from the rotational speed sensor 140, and control data (e.g., ABS or ESP algorithm-type data) in a memory circuit 160, to control the application of the brake 130 via motor driver circuit 170. In some implementations, the processor 150 uses other information, such as feedback from the brake 130 relating to the position, speed, or temperature of the brake (or related components) as may be applicable to the brake's effectiveness.

The remote brake controller circuit 100 also includes a vehicle network interface circuit 180 that interfaces with one or more other brake controller circuits as applied to another wheel, and further to interface with a user interface device such as a brake pedal or brake lever. Via the network interface circuit 180, the processor 150 can obtain and/or provide real-time information, such as wheel speed, gear rate or other conditions of the respective wheels. The processor 150 (and other processors at other wheels) can use this information to control the motor driver 170 and, correspondingly, the brake 130. When applicable, the processor 150 uses information received over the network interface circuit 180 as an input to an algorithm used to effect ABS or ESP types of braking control.

In this context, remote brake controller circuits corresponding to the circuit 100 can be used at each wheel of a vehicle, to respectively apply braking to each wheel and communicate with the other wheels for sharing data, via the network interface circuit 180. When coupled with a user interface such as a brake pedal input, such a system involves separate, wheel-specific brake control processing without the need for a central controller, based upon the brake pedal input and information shared between the individual brake controller circuits.

Another example embodiment, as may be implemented using the brake controller circuit 110, is directed to an integrated wheel control circuit for controlling the application of braking force to a vehicle drive component that moves a vehicle. The integrated circuit includes a memory circuit, rotational speed sensor, network interface circuit, brake driver circuit and a logic circuit. The memory circuit stores executable data for controlling the application of braking force to the drive component. The rotational speed sensor senses the rotational speed of the drive component, and provides the sensed speed for brake control (e.g., to detect wheel slip). The network interface circuit receives rotational speed data from at least one other drive component of the vehicle (e.g., a wheel) over a vehicle network, as well as a braking input signal. The network interface circuit also sends data indicative of the sensed rotational speed over the network for use in controlling other vehicle drive components. The brake driver circuit configured generates a drive signal for driving a brake to apply braking force to the drive component. The logic circuit accesses and uses the executable data in the memory circuit to control the brake driver circuit for applying the braking force, based on the rotational speed sensed by the rotational speed sensor (e.g., based on wheel slip) and both the braking input signal and rotational speed data received via the network interface circuit.

FIG. 2 shows a distributed (e.g., decentralized) braking system 200, according to another example embodiment of the present invention. The system 200 is applicable for applying braking force to four wheels 210, 220, 230 and 240. At each wheel, a combination of a brake and integrated wheel ECU chip is shown, with the brakes labeled as an electrical wedge brake by way of example and illustration. Accordingly, brake/ECU chip combinations 212/214, 222/224, 232/234 and 242/244 are respectively implemented at wheels 210, 220, 230 and 240.

Each of the ECU chips 214, 224, 234 and 244 includes a network interface circuit configured for communicating over a vehicle network, with communications represented by double-ended arrows. As discussed above, each of the chips may communicate information regarding braking pressure applied and feedback relative to wheel slip, for systems such as ABS and ESP systems. Referring to FIG. 1 by way of example, one or more of the ECU chips in FIG. 2 may be implemented using a chip similar to the chip 110, with a rotational speed sensor 140 that detects the rotational speed of the corresponding wheel. In this context, each ECU chip 214, 224, 234 and 244 controls the application of braking pressure by brakes 212, 222, 232 and 242 at each corresponding wheel 210, 220, 230 and 240, by individually processing algorithm-type data using wheel speed input data received from the other ECU chips via the network.

A user interface device 250, which may be integrated with or separate from the system 200, also communicates over the vehicle network for providing a braking input. The user interface device 250 may, for example, include a brake pedal or lever, which generates a braking signal based upon actuation of the pedal or lever by a user, and sends the braking signal to each of the ECUs 214, 224, 234 and 244.

In some implementations, the user interface device 250 includes a mechanism that provides feedback to the user in the form of a force or pressure back upon the pedal/lever. Such feedback can be emulated, for example, to provide increasing force against the pedal/lever as increasing brake pressure is applied, and may also include a variable feedback based upon a sensed position of brakes at each ECU chip. In some embodiments, the ECU chips are implemented with a sensor that senses applied pressure at a brake, and a processor in the ECU that generates a feedback signal representing the applied pressure. The user interface device 250 can process the feedback from one or more of the ECU chips to provide a force-feedback to the user.

The system 200 is shown in a configuration involving four wheels 210, 220, 230 and 240, with the understanding that fewer or more wheels or other vehicle drive components are implemented to suit different applications. For example, in motorcycle, scooter or other two-wheel applications, a system similar to the system 200 is implemented with two of the wheels (e.g., 210, 220) and related brake (212/222) and chip (214/224) components. As other examples, a system similar to the system 200 is implemented with automotive, military, industrial or other vehicle applications involving more than four wheels. In addition, while wheels are shown, other drive components such as tracks can be implemented using a similar approach.

In another example embodiment, and referring again to the system 200 in FIG. 2, the respective ECU chips 214, 224, 234 and 244 are configured to operate in an independently fail-safe manner, in which the failure of one of the ECU chips does not render all of the other ECU chips inoperable. Such a failure may involve, for example, failure of the ECU chip or other components including the brake associated with the chip, that partially or fully incapacitate the ability of the system 200 to apply braking force to a particular wheel. As each of the ECU chips independently controls the application of a brake to the ECU chip's corresponding wheel, failure of one of the ECU chips to apply braking force to one of the wheels is countered by the ability of the other ECU chips to continue to operate.

In some implementations, each ECU chip is configured to sense a failure condition from the other ECU chips. In response to detecting such a condition, the ECU uses that failure condition as an input to control the application of a corresponding brake to a corresponding wheel. For instance, using information indicating that the ECU chip 214 and/or the brake 212 is incapacitated to some degree or fully incapacitated, the operable ECU chips 224, 234 and 244 respond by controlling the application of the respective brakes 222, 232, 242 in a manner that compensates for the lack of full braking capability at the wheel 210.

Another example embodiment, as may be implemented with the system 200 show in FIG. 2, is directed to a distributed vehicle braking system. The system includes a user interface device that receives a braking input from a user for slowing the vehicle, and for each of at least two wheels that drive the vehicle along a surface, a brake that applies a braking force to slow the wheel, and a wheel-specific wheel control circuit. The wheel control circuit includes an integrated circuit chip having a memory circuit, a rotational speed sensor, a network interface circuit, a brake driver circuit and a processor circuit. The memory circuit stores executable data for controlling the brake, such as for applying ABS or ESP types of control to mitigate or prevent wheel slippage. The rotational speed sensor detects the rotational speed of the wheel. The network interface circuit receives rotational wheel speed data from the wheel control circuit for the other of the at least two wheels and sends rotational wheel speed data from the rotational speed sensor to the wheel control circuit(s) for the other of the at least two wheels. The network interface circuit further receives a braking input signal from the user interface device, for use in applying the brake to the wheel. The brake driver circuit generates a drive signal to drive the brake to apply braking force to the wheel. The processor circuit accesses and uses the executable data in the memory circuit to control the brake driver circuit to generate the drive signal, based on the rotational wheel speed detected by the rotational speed sensor, the braking input signal and the wheel speed data for other wheels of the vehicle received via the network interface circuit. The respective processor circuits for each wheel independently control the brake driver circuit for the wheel, relative to the processor circuit of another of the at least two wheels.

Based upon the above discussion and illustrations, those skilled in the art will readily recognize that various modifications and changes may be made to the present invention without strictly following the exemplary embodiments and applications illustrated and described herein. For example, different types of speed sensors and communications networks may be used in connection with the control circuits and brake systems as discussed herein. Furthermore, the various processing approaches described herein can be implemented using a variety of devices and methods including general purpose processors implementing specialized software, digital signal processors, programmable logic arrays, discreet logic components and fully-programmable and semi-programmable circuits such as PLAs (programmable logic arrays). In this context, terms such as a logic circuit or processor may be implemented using one or more of the aforesaid devices and methods. Such modifications do not depart from the true spirit and scope of the present invention, including that set forth in the following claims.

What is claimed is:

1. For use in a vehicle having at least two vehicle drive components and a remote braking mechanism for each of the drive components, in which a remote braking mechanism control unit for a first one of the drive components provides rotational speed data for the first drive component as an output, for use by a second remote braking mechanism control unit for a second one of the drive components, the control unit for the second drive component comprising:

a rotational speed sensor configured and arranged to sense the rotational speed of the second drive component and to output rotational speed data for the second drive component;

a network interface circuit configured and arranged to communicate with the control unit for the first one of the drive components over a vehicle communications network; and a logic circuit configured and arranged to receive the rotational speed data for the first drive component via the network interface circuit, transmit the rotational speed data sensed by the rotational speed sensor, via the network interface circuit, to the control unit for the first one of the drive components, and in response to receiving a braking input signal via the network interface circuit, generate an output to control the second remote braking mechanism to apply braking force to the second drive component independently from the first control unit, based upon the sensed rotational speed of the second drive component, the received rotational speed data for the first drive component, and a braking input signal received from a user interface braking device.

2. The control unit of claim 1, wherein
the rotational speed sensor, network interface circuit and logic circuit are integrated on the same integrated circuit chip, and
the rotational speed sensor is a magnetoresistive sensor configured to sense the rotational speed of the second drive component by sensing changes in a magnetic field presented to the chip as a function of the rotation of the second drive component.

3. The control unit of claim 1, wherein
the rotational speed sensor is a magnetoresistive sensor configured to sense the rotational speed of the drive component by sensing changes in a magnetic field presented to the integrated circuit as a function of the rotation of the drive component, and
the rotational speed sensor, network interface circuit and logic circuit are integrated on an integrated circuit chip configured for placement immediately adjacent a reference component that rotates with the second drive component and causes the changes in the magnetic field.

4. An integrated wheel control circuit for controlling the application of braking force to a vehicle drive component that moves a vehicle, the integrated circuit comprising:
a memory circuit that stores executable data for controlling the application of braking force to the drive component;
a rotational speed sensor configured to sense the rotational speed of the drive component;
a network interface circuit configured to receive rotational speed data from at least one other drive component of the vehicle over a vehicle network, receive a braking input signal, and send data indicative of the sensed rotational speed over the network for use in controlling other vehicle drive components;
a brake driver circuit configured to generate a drive signal for driving a brake to apply braking force to the drive component; and
a logic circuit configured to access and use the executable data in the memory circuit to control the brake driver circuit for applying the braking force, based on the rotational speed sensed by the rotational speed sensor and both the braking input signal and rotational speed data received via the network interface circuit.

5. The circuit of claim 4, wherein the logic circuit is configured to control the brake driver circuit to generate a drive signal that drives the brake to intermittently apply braking force to the drive component based upon the sensed rotational speed indicating that the drive component is slipping.

6. The circuit of claim 4, wherein the logic circuit is configured to control the brake driver circuit to generate a drive signal for controlling a single brake driver circuit for a wheel that is rotatably driven to drive the vehicle along a surface, by processing data corresponding to the sensed rotational speed of the wheel and rotational speed data received via the network interface circuit from wheel control circuits for at least two other wheels of the vehicle, logic circuits in each wheel control circuit being configured to independently control the brake driver circuit for different wheels of the vehicle.

7. The circuit of claim 4, wherein the brake driver circuit is configured to generate a drive signal for driving a brake to apply braking force to a vehicle drive component that includes a wheel that is rotatably driven to drive the vehicle along a surface.

8. The circuit of claim 4, wherein
the rotational speed sensor is a magnetoresistive sensor configured to sense the rotational speed of the drive component by sensing changes in a magnetic field presented to the integrated circuit as a function of the rotation of the drive component, and
the integrated circuit is a chip configured for placement immediately adjacent a reference component that rotates with the vehicle drive component and causes the changes in the magnetic field, to sense the rotation of the reference component and provide an output characterizing the rotation.

9. The circuit of claim 4, wherein
the rotational speed sensor includes at least one of an anisotropic magnetoresistive (AMR) sensor, giant magnetoresistive (GMR) sensor, and a Hall sensor, and
the integrated circuit is a chip configured for placement immediately adjacent a reference component that rotates with the vehicle drive component, to permit the rotational speed sensor to sense the rotation of the reference component and provide an output characterizing the rotation.

10. The circuit of claim 4, wherein the brake driver circuit is configured to generate a drive signal for driving an electrical wedge brake to apply braking force to a wheel.

11. The circuit of claim 4, wherein
the memory circuit stores executable data including algorithm data for at least one of an anti-lock braking system (ABS) or electronic stability program (ESP), and
the logic circuit executes the algorithm data with the rotational speeds as an input to control the brake driver circuit to selectively drive the brake to apply braking force to the drive component.

12. The circuit of claim 4,
further including a brake condition sensor configured to sense a characteristic of the brake, and
wherein the network interface circuit is configured to send an output characterizing the sensed brake characteristic as feedback to a user input device that generates the braking input signal for applying the brake.

13. The circuit of claim 4, wherein the logic circuit is configured to control the brake driver circuit in response to receiving a signal, via the network interface circuit, indicating a failure condition of another wheel control circuit for another wheel of the vehicle.

14. A distributed vehicle braking system comprising:
a user interface device configured to receive a braking input from a user for slowing the vehicle; and
for each of at least two wheels that drive the vehicle along a surface,
a brake configured to apply a braking force to slow the wheel,
a wheel control circuit comprising, in an integrated circuit chip,
a memory circuit that stores executable data for controlling the brake,
a rotational speed sensor configured to detect the rotational speed of the wheel,
a network interface circuit configured to receive rotational wheel speed data from the wheel control circuit for the other of the at least two wheels, receive a braking input signal from the user interface device, and send rotational wheel speed data from the rotational speed sensor to the wheel control circuit for the other of the at least two wheels,
a brake driver circuit configured to generate a drive signal to drive the brake to apply braking force to the wheel, and
a processor circuit configured to access and use the executable data in the memory circuit to control the brake driver circuit to generate the drive signal, based on the rotational wheel speed detected by the rotational speed sensor, the braking input signal and the wheel speed data for other wheels of the vehicle received via the network interface circuit, the respective processor circuits for each wheel being configured to independently control the brake driver circuit for the wheel, relative to the processor circuit of another of the at least two wheels.

15. The system of claim 14, further including a vehicle network configured to communicate data between each of the network interface circuits for each wheel, and between the network interface circuits and the user interface device.

16. The system of claim 14, wherein the processor circuit at each wheel is configured and arranged to control the brake driver circuit to generate a drive signal that controls the brake to intermittently apply braking force to the wheel based upon the detected rotational wheel speed indicating that the wheel is slipping, to transmit the sensed rotational wheel speed at the wheel to the other processor circuit via the network interface circuit, and to generate the drive signal using the transmitted and received rotational speed data as well as the braking input signal as inputs with the executable data.

17. The system of claim 14, wherein a logic circuit is configured to control the brake driver circuit to generate a drive signal that controls the brake to intermittently apply braking force to the wheel based upon the received wheel speed data indicating that another of the at least two wheels is slipping.

18. The system of claim 14,
further including, for each wheel, an encoder wheel connected to the wheel to rotate with the wheel, and
wherein the integrated circuit chip is located immediately adjacent the encoder wheel and the rotational speed sensor is a magnetoresistive sensor configured to sense rotation of the encoder wheel via an alternating magnetic field influenced by the encoder wheel.

19. The system of claim 14, wherein the brake is an electrical wedge brake.

20. The system of claim 14, wherein
the memory circuit stores executable data including algorithm data for at least one of an anti-lock braking system (ABS) or electronic stability program (ESP), and
the processor circuit executes the algorithm data with the rotational speeds as an input to control the brake driver circuit to generate the drive signal.

21. The system of claim 14, wherein the processor circuit is configured to control the brake driver circuit to generate the drive signal in response to receiving a signal, via the network interface circuit, indicating a failure condition of another wheel control circuit for another wheel of the vehicle.

22. A method for controlling the application of braking force to drive components that move a vehicle, each drive component having a control unit that independently controls the application of braking force to the drive component, relative to other drive components in the vehicle, the method comprising:
in a processor circuit at each drive component having a brake,
storing executable data for controlling the application of braking force to the drive component,
sensing the rotational speed of the drive component,
receiving rotational speed data from a processor circuit at one of the other drive components over a vehicle network,
receiving a braking input signal,
sending data indicative of the sensed rotational speed of the drive component to the other processor circuits at the other drive components over the network,
generating a drive signal for driving the brake to apply braking force to the drive component, and
in a logic circuit, accessing and using the stored executable data to control the generation of the drive signal for driving the brake, based on the rotational speed sensed by the rotational speed sensor and both the braking input signal and rotational speed data received via the network.

23. The method of claim 22, wherein
accessing and using the stored executable data to control the generation of the drive signal for driving the brake includes generating a drive signal that controls the brake to intermittently apply braking force to the drive component based upon the sensed rotational speed indicating that the drive component is slipping, and
the processor circuit is an integrated circuit chip having a rotational speed sensor, the logic circuit and a communication circuit, in which
the rotational speed sensor senses the rotational speed of the drive component, and
the logic circuit receives both the braking input signal and the rotational speed data from the processor circuit at the one of the other drive components via the communication circuit, and sends the data indicative of the sensed rotational speed via the communication circuit, and generates the drive signal.

* * * * *